US012476405B2

(12) United States Patent
Zhong et al.

(10) Patent No.: US 12,476,405 B2
(45) Date of Patent: Nov. 18, 2025

(54) CONNECTOR FOR ELECTRICAL CONNECTION BETWEEN A WIRE AND A CONDUCTIVE LOAD

(71) Applicant: Tyco Electronics (Shanghai) Co., Ltd., Shanghai (CN)

(72) Inventors: Yuan Zhong, Shanghai (CN); Tian (Sam) Xia, Shanghai (CN); Weifeng Bian, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 507 days.

(21) Appl. No.: 17/953,758

(22) Filed: Sep. 27, 2022

(65) Prior Publication Data

US 2023/0101670 A1 Mar. 30, 2023

(30) Foreign Application Priority Data

Sep. 27, 2021 (CN) .......................... 202111133697.6

(51) Int. Cl.

| | |
|---|---|
| ***H01R 13/24*** | (2006.01) |
| ***H01R 4/48*** | (2006.01) |
| ***H01R 13/15*** | (2006.01) |
| ***H01R 13/502*** | (2006.01) |
| ***H01R 13/629*** | (2006.01) |

(52) U.S. Cl.

CPC ........... *H01R 13/2421* (2013.01); *H01R 4/48* (2013.01); *H01R 13/15* (2013.01); *H01R 13/502* (2013.01); *H01R 13/629* (2013.01)

(58) Field of Classification Search

CPC ...... H01R 13/2421; H01R 4/48; H01R 13/15; H01R 13/502; H01R 13/629; H01R 4/20; H01R 13/40; H01R 12/714

See application file for complete search history.

(56) References Cited

U.S. PATENT DOCUMENTS

| | | | | |
|---|---|---|---|---|
| 7,731,513 B1 * | 6/2010 | Lin | H01R 13/2421 439/179 |
| 8,337,256 B1 * | 12/2012 | Lin | H01R 12/7094 439/700 |
| 11,381,012 B2 * | 7/2022 | Wang | H01R 13/2421 |
| 11,695,230 B2 * | 7/2023 | Liu | H01R 4/28 439/816 |
| 2004/0077225 A1 * | 4/2004 | Chun-Fu | H01R 13/2471 439/700 |
| 2018/0084873 A1 * | 3/2018 | Kallman | H01R 13/6315 |
| 2021/0057837 A1 * | 2/2021 | Wang | H01R 13/17 |
| 2021/0328376 A1 * | 10/2021 | Liu | H01R 4/28 |
| 2023/0101670 A1 * | 3/2023 | Zhong | H01R 13/502 439/700 |

* cited by examiner

*Primary Examiner* — Abdullah A Riyami
*Assistant Examiner* — Nader J Alhawamdeh
(74) *Attorney, Agent, or Firm* — Barley Snyder

(57) ABSTRACT

A connector for electrical connection between a wire and a conductive load includes a housing and an elastic conductive component having a portion extending through the housing. The elastic conductive component is connectable to the wire. The elastic conductive component is movable up and down relative to the housing to connect with or separate from the conductive load, electrically connecting or disconnecting an electrical connection between the wire and the conductive load.

18 Claims, 5 Drawing Sheets

CONNECTOR FOR ELECTRICAL CONNECTION BETWEEN A WIRE AND A CONDUCTIVE LOAD

CROSS-REFERENCE TO RELATED APPLICATIONS

This application claims the benefit of the filing date under 35 U.S.C. § 119(a)-(d) of Chinese Patent Application No. 202111133697.6, filed on Sep. 27, 2021.

FIELD OF THE INVENTION

The disclosure relates to electrical connection technology and, more particularly, to a connector.

BACKGROUND

A current connector usually includes a male terminal 101 and a female terminal 102 that are mutually inserted into each other (for example, as shown in FIG. 1). However, if the space is limited, the male terminal 101 and the female terminal 102 need an angular coordination (for example, when the mating surface at one terminal is plane); the mutually inserted structure cannot adapt to this application. Further, the mutually inserted structure not only has complex assembly and a high cost, but also occupies a large space.

SUMMARY

A connector for electrical connection between a wire and a conductive load includes a housing and an elastic conductive component having a portion extending through the housing. The elastic conductive component is connectable to the wire. The elastic conductive component is movable up and down relative to the housing to connect with or separate from the conductive load, electrically connecting or disconnecting an electrical connection between the wire and the conductive load.

BRIEF DESCRIPTION OF THE DRAWINGS

Various embodiments will be illustrated and explained hereinafter with reference to the accompanying figures. The figures serve to illustrate the basic principle, so that only aspects necessary for understanding the basic principle are illustrated. It should be noted that the figures are not drawn to scale and the use of the same reference numbers in different figures indicates similar or identical features.

DETAILED DESCRIPTION OF THE EMBODIMENTS

Hereinafter, details of embodiments will be described with reference to the figures that form part of the invention. The figures illustrate particular embodiments of the invention by way of example only and the illustrated embodiments are not intended to present an exhaustive list of embodiments of the invention. It is to be understood that other embodiments may be utilized and that structural or logical modifications may be made without departing from the spirit and scope of the invention. Therefore, the following description is not intended to limit the scope of the invention, which is defined by the appended claims.

The present invention provides a connector for electrical connection between a wire and a conductive load, the connector comprises: a housing; at least one elastic conductive component, a portion of each of the at least one elastic conductive component passes through the housing, and the each of the elastic conductive component is connectable to the wire, and wherein the each of the elastic conductive component is configured to be movable up and down relative to the housing, so that the each of the elastic conductive component is in contact with the conductive load or separate from the conductive load, to establish or release the electrical connection between the wire and the conductive load.

The following is an example of the application of the connector in electrical equipment, the embodiments of the present invention will be described in detail in combination with the accompanying figures.

Figure 1:
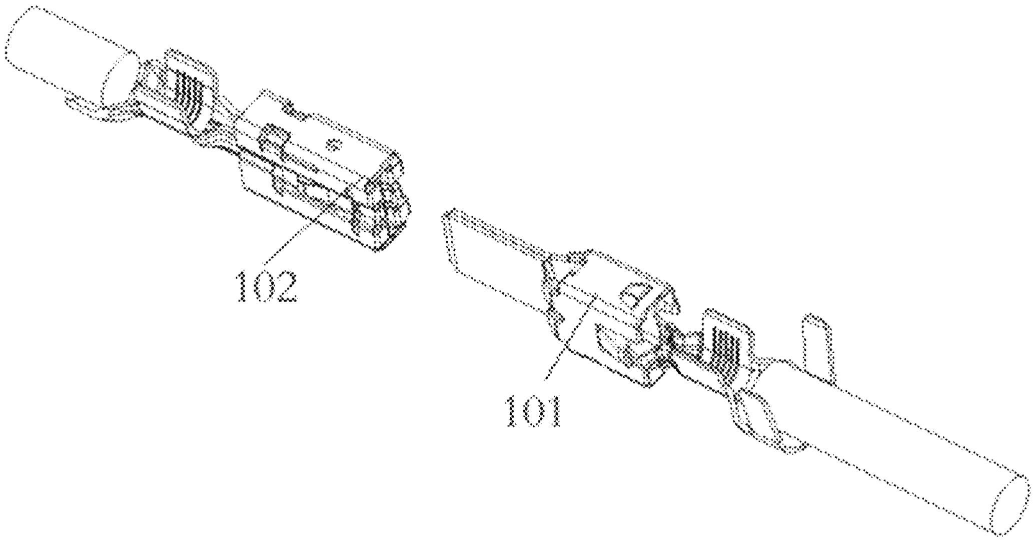
FIG. 1 is a perspective view of a connector according to the prior art.
Figure 2:
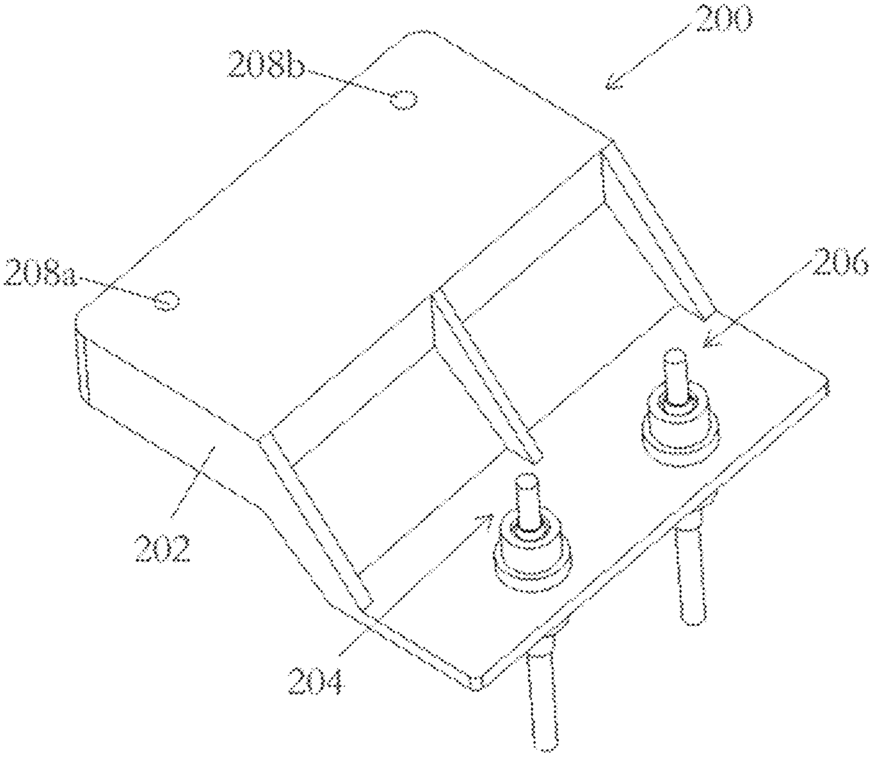
FIG. 2 is a perspective view of a connector according to an embodiment.
Figure 3:
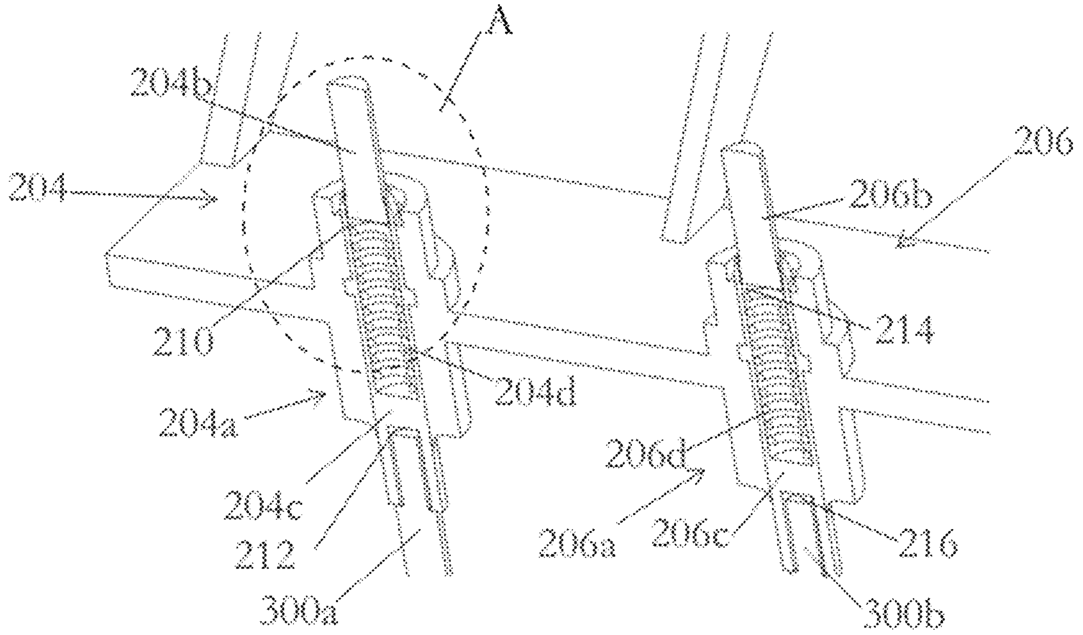
FIG. 3 is a sectional perspective view of the connector of FIG. 2.
Figure 4:
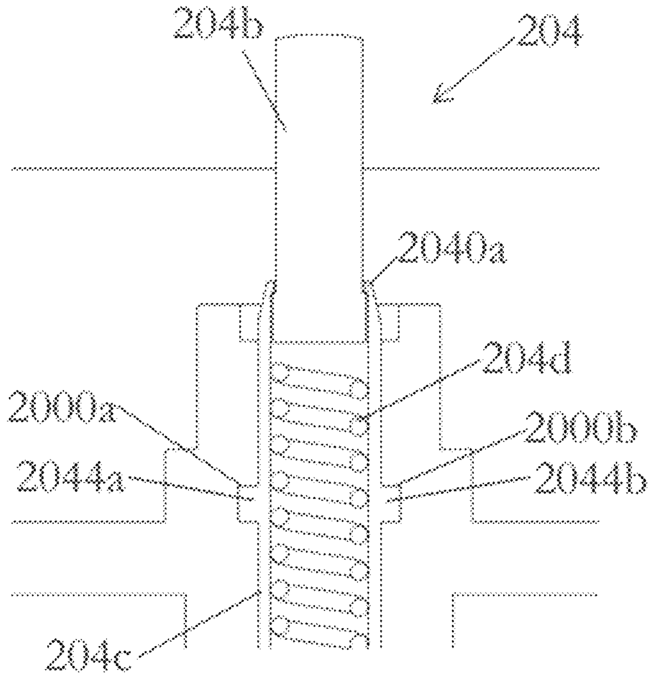
FIG. 4 is a detail sectional view of a portion A of FIG. 3.
Figure 5:
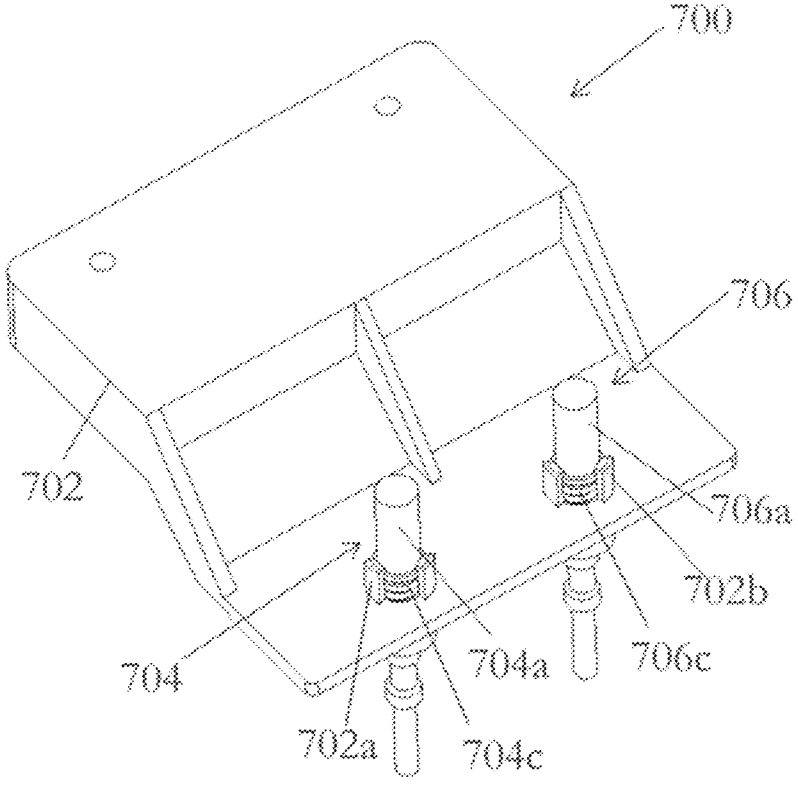
FIG. 5 is a perspective view of a connector according to another embodiment.
Figure 6:
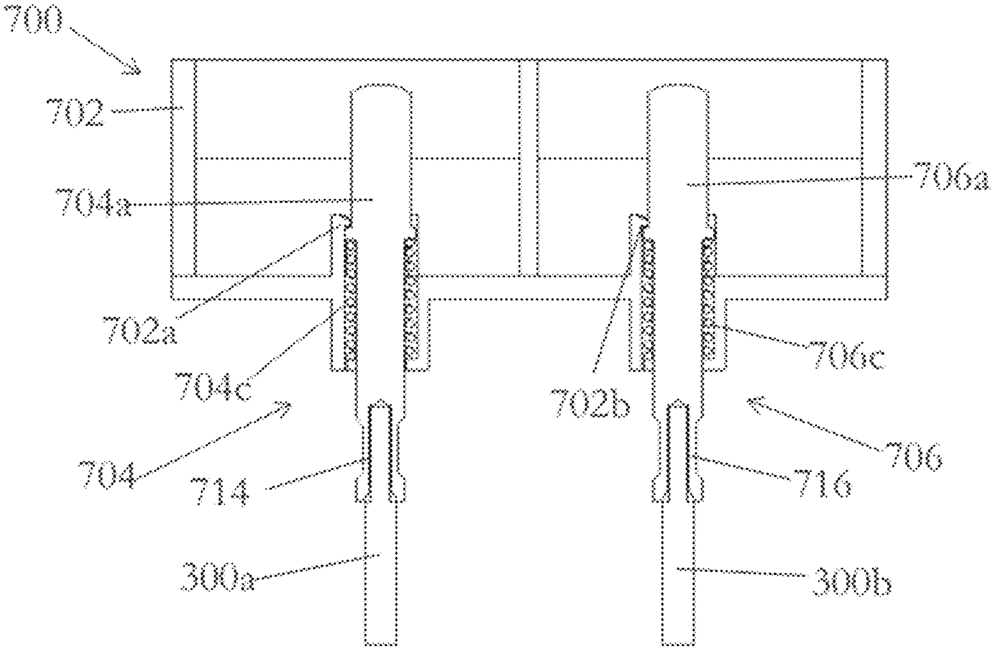
FIG. 6 is a sectional side view of the connector of FIG. 5.
Figure 7:
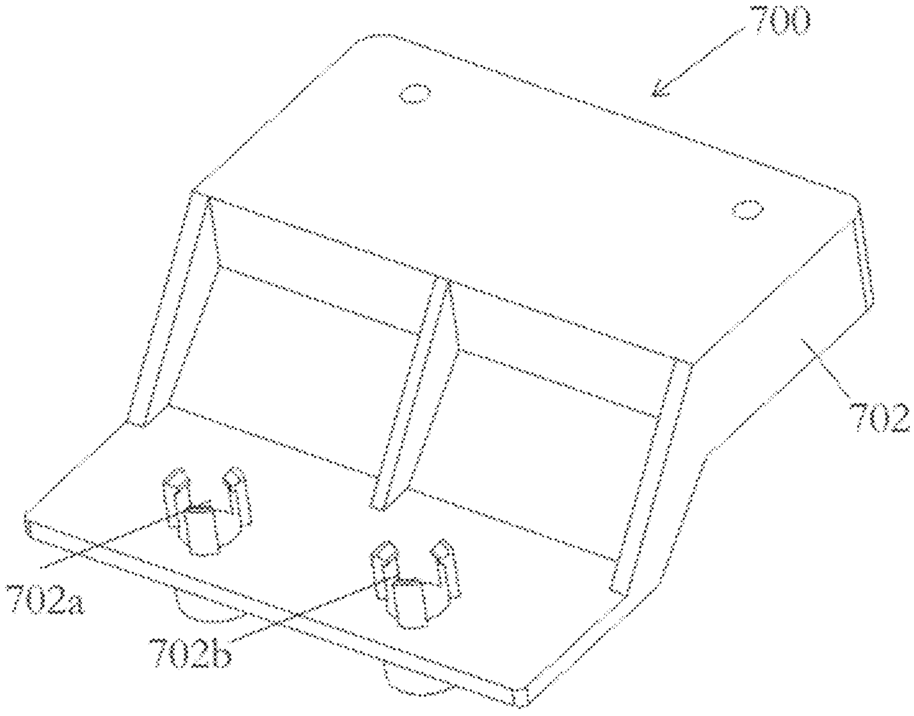
FIG. 7 is a perspective view of the connector of FIG. 5 without a conductive terminal.

Some concepts in the present invention are relative concepts with reference to FIG. 2, FIG. 3 and FIG. 4, such as front, rear, left, right, upper, lower, front end, rear end, left end, right end, upper part, lower part, left side, right side, longitudinal, transverse, etc.

Figure 8:
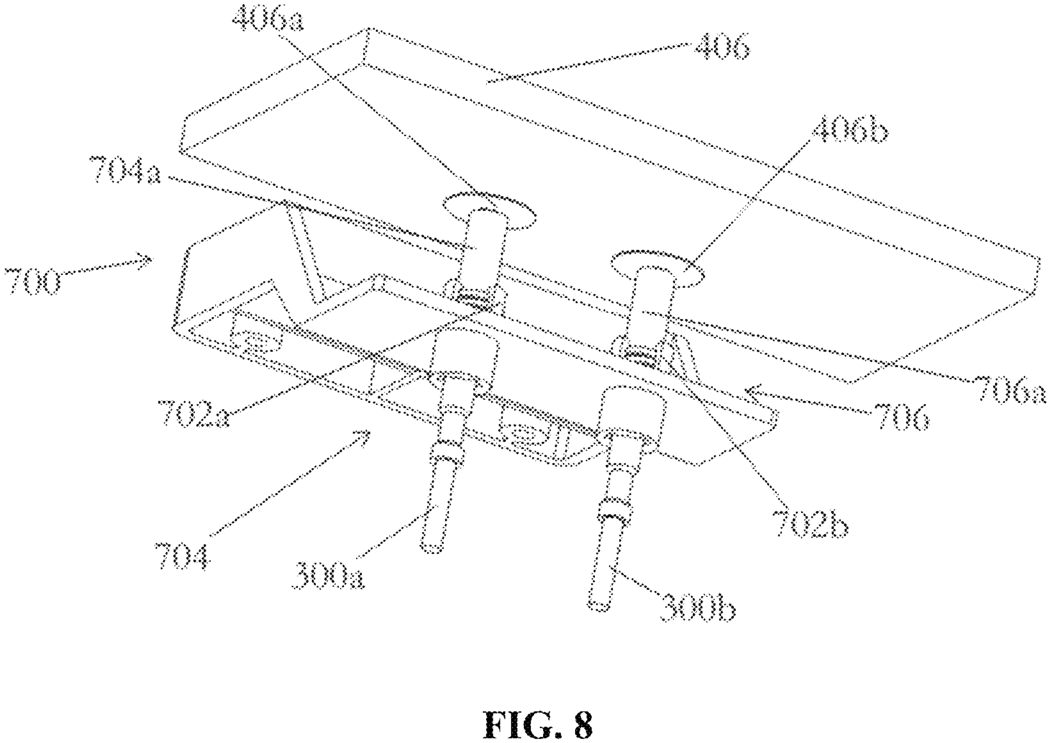
FIG. 8 is a perspective view of the connector of FIG. 5 in electrical contact with a conductive load.
Figure 9:
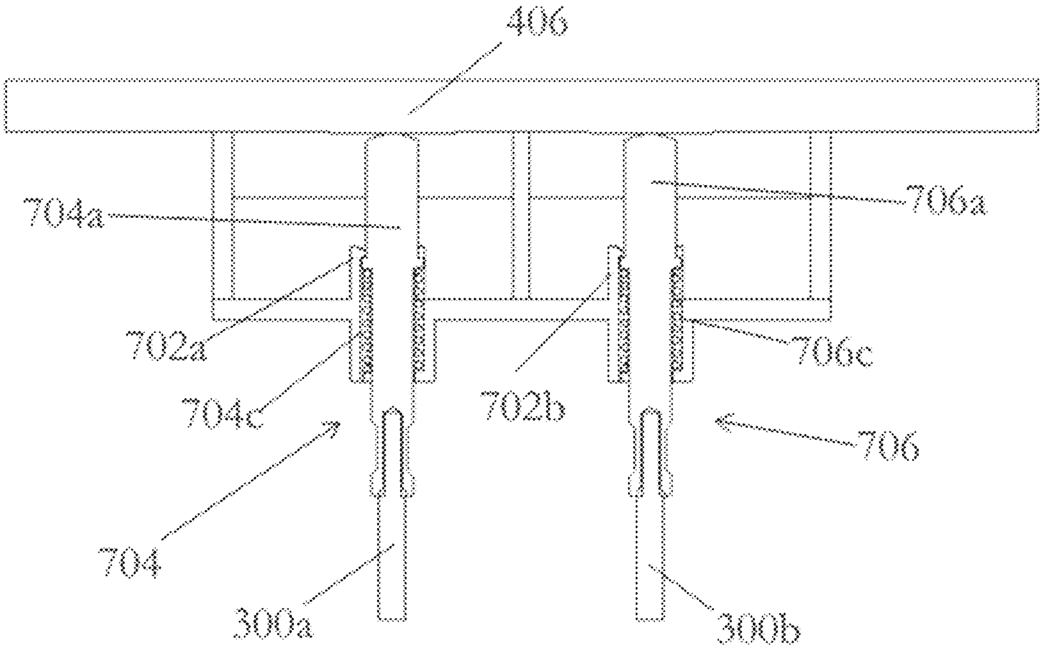
FIG. 9 is a sectional front view of the connector of FIG. 8.

In one embodiment, the electrical equipment includes an electrical equipment housing, a power supply rack, a power supply board (the power supply board includes a conductive load 406 as shown in FIG. 8 and FIG. 9) and a connector 200 (as shown in FIG. 2). The connector 200 is disposed on the power supply rack, wherein the connector 200 is installed on the electrical equipment via the mounting holes **208*a* and 208*b* as shown in FIG. 2**.

As shown in FIGS. 2-4, the connector 200 includes a housing 202 and two elastic conductive components 204, 206.

As shown in FIGS. 3 and 4, the elastic conductive component 204 includes a conductive terminal **204*a* and a spring 204*d*. The conductive terminal 204*a* includes an upper part 204*b* and a lower part 204*c*, the lower part 204*c* is connected with the wire 300*a*. The lower part 204*c* includes an accommodating cavity 210 (i.e., the first accommodating cavity) and an accommodating cavity 212 (i.e., the second accommodating cavity). The upper part 204*b* and the spring 204*d* are accommodated in the accommodating cavity 210. One end of the spring 204*d* is fixedly connected with the upper part 204*b*, the other end of the spring 204*d* is fixedly connected with the bottom of the accommodating cavity 210. The wire 300*a* is accommodated in the accommodating cavity 212. The spring 204*d* can be compressed to move downward via the upper part 204*a* in the accommodating cavity 210, and the upper part 204*a* can be pushed to move upward through the spring 204*d* in the accommodating cavity 210. Moreover, the lower part 204*c* includes a stop part 2040*a* (i.e., the first stop part) to prevent the upper part 204*b* from leaving the lower part 204*c***. The lower part

204*c* includes locking parts (2044*a*, 2044*b*) (such as a pair of protrusions), and the housing 202 is provided with matching locking parts (2000*a*, 2000*b*) (such as a pair of grooves matched with the pair of protrusions), the lower part 204*c* is fixed in the housing 202 with cooperation of the locking parts (2044*a*, 2044*b*) and the matching locking parts (2000*a*, 2000*b*).

As shown in FIGS. 3 and 4, the elastic conductive component 206 includes a conductive terminal 206*a* and a spring 206*d*. The conductive terminal 206*a* includes an upper part 206*b* and a lower part 206*c*, the lower part 206*c* is connected with the wire 300*b*. The lower part 206*c* includes accommodating cavities 214 and 216, the upper part 206*b* and the spring 206*d* are accommodated in the accommodating cavity 214. One end of the spring 206*d* is fixedly connected with the upper part 206*b*, and the other end of the spring 206*d* is fixedly connected with the bottom of the accommodating cavity 214. The wire 300*b* is accommodated in the accommodating cavity 216. In addition, the spring 206*d* can be compressed to move downward via the upper part 206*a* in the accommodating cavity 214, and the upper part 206*a* can be pushed to move upward via the spring 206*d* in the accommodating cavity 214. The structure of the elastic conductive component 206 is exactly the same as the structure of the elastic component 204, so the other details of the elastic conductive component 206 will not be described herein.

As shown in FIGS. 2, 8, and 9, when the connector 200 is disposed on the power supply rack of the electrical equipment, the upper part 204*b* of the conductive terminal 204*a* extends upward through the power supply rack. When the power supply board is placed in the electrical equipment, the conductive load 406 (which is the same as the conductive load 406 in FIGS. 8 and 9) on the power supply board presses the elastic conductive component 204 and the elastic conductive component 206. The upper part 204*b* of the conductive terminal 204*a* of the elastic conductive component 204 and the upper part 206*b* of the conductive terminal 206*a* of the elastic conductive component 206 are in contact with the protrusions 406*a* and 406*b* of the conductive load 406, respectively (as shown in FIG. 8), so as to establish the electrical connection between the wire 300*a* and the conductive load 406, and the electrical connection between the wire 300*b* and the conductive load 406.

When the power supply board is removed from the electrical equipment, the upper part 204*b* of the conductive terminal 204*a* and the upper part 206*b* of the conductive terminal 206*a* of the elastic conductive component 206 are separated from the conductive load 406, so that the electrical connection between the wire 300*a* and the conductive load 406, and the electrical connection between the conductor 300*b* and the conductive load 406 are disconnected. The upper part 204*b* of the conductive terminal 204*a* and the upper part 206*b* of the conductive terminal 206*a* of the elastic conductive component 206 return to the initial position state under the action of the spring force respectively.

In the embodiment shown in FIGS. 2-4, the conductive load 406 is integrated with the power supply board, in another embodiment, the conductive load 406 can also be an independent component. In the embodiment shown in FIGS. 2-4, an electrical connection is formed by contacting the upper part 204*b* of the conductive terminal 204*a* and the upper part 206*b* of the conductive terminal 206*a* with the protrusion 406*a* and the protrusion 406*b* respectively (as shown in FIGS. 8 and 9). In another embodiment, the protrusion 406*a* and the protrusion 406*b* can be replaced by a pair of recesses, the upper part 204*b* of the conductive terminal 204*a* and the upper part 206*b* of the conductive terminal 206*a* could form an electrical connection by contacting with one of the pair of recesses respectively.

In another embodiment, as shown in FIGS. 5-9, the connector 700 includes a housing 702 and two elastic conductive components 704, 706. The basic structure of the connector 700 is the same as that of the connector 200. The difference is between the structure of the elastic conductive component 704 and the elastic conductive component 204. The elastic conductive component 704 includes an integrated conductive terminal 704*a* and a spring 704*c* that wraps around an outer surface of the conductive terminal 704*a*. The wire 300*a* is accommodated in the accommodating cavity 714 of the conductive terminal 704*a*, and the buckle 702*a* (i.e., the second stop part) constrains the conductive terminal 704*a* in the housing 702. Moreover, the buckle 702*a* can only cover a part of the spring 704*c*, and another part of the spring 704*c* is exposed outside the housing 702.

The elastic conductive component 706 includes an integral conductive terminal 706*a* and a spring 706*c* that wraps around an outer surface of the conductive terminal 706*a*, the wire 300*b* is accommodated in the accommodating cavity 716 of the conductive terminal 706*a*, as shown in FIGS. 5-9. The buckle 702*b* constrains the conductive terminal 706*a* in the housing 702. In this embodiment, the buckle 702*b* can only cover part of the spring 706*c*, and another part of the spring 706 is exposed outside the housing 702. The buckles 702*a* and 702*b* are integrated with the housing 702. In the embodiment shown in FIG. 7, the number of the buckles 702*a* and 702*b* is three, and in another embodiment, the number of the buckles 702*a* and 702*b* can be more than three. Although in the above embodiments, the wire is electrically connected with the conductive terminal by being accommodated in the accommodating cavity, in other embodiments, the wire can be electrically connected with the conductive terminal in other suitable ways.

Compared with a connector in the prior art, the connector of the present invention has simple structure, small size, and is applicable to the scenarios where the mating surface at one terminal is plane.

Although the application in electrical equipment is specifically described in the above embodiments for illustration, the above technical scheme can also be applied to other application scenarios where the mating surface at one terminal is plane.

While the invention has been described with reference to particular embodiments thereof, the particular embodiments are provided merely as examples and are not intended to limit the scope of the invention. It will be apparent to those skilled in the art that various alterations and modifications, additions or deletions may be made to the disclosed embodiments without departing from the spirit and scope of the invention.

What is claimed is:

1. A connector for electrical connection between a wire and a conductive load, comprising:

a housing; and an elastic conductive component including a spring and a conductive terminal, the elastic conductive component having a portion extending through the housing, the elastic conductive component is connectable to the wire by the conductive terminal, the conductive terminal of the elastic conductive component is movable up and down relative to the housing by cooperating with the spring to connect with or separate from the conductive load, electrically connecting or disconnecting an electrical connection between the wire and the conductive load, the conductive terminal has an upper part and a lower part connected to the wire, the lower part has a first accommodating cavity accommodating the upper part and the spring and a second accommodating cavity accommodating the wire.

2. The connector of claim 1, wherein the spring can be compressed to move downward via the upper part and the upper part can be pushed to move upward via the spring.

3. The connector of claim 2, wherein the lower part has a locking part and the housing has a matching locking part, the lower part is fixed in the housing by cooperating between the locking part and the matching locking part.

4. The connector of claim 2, wherein the upper part is fixedly connected with a first end of the spring.

5. The connector of claim 4, wherein a second end of the spring opposite the first end is fixedly connected with a bottom of the first accommodating cavity.

6. The connector of claim 5, wherein the lower part has a first stop part preventing the upper part from separating from the lower part.

7. The connector of claim 1, wherein the spring wraps around an outer surface of the conductive terminal.

8. The connector of claim 7, wherein the spring can be compressed by the conductive terminal to move downward and the conductive terminal can be pushed by the spring to move upward.

9. The connector of claim 8, wherein the housing has a second stop part retaining the conductive terminal in the housing.

10. The connector of claim 1, wherein the spring extends around the conductive terminal.

11. An electrical equipment comprising:

an electrical equipment housing;

a power supply rack;

a power supply board including a conductive load having a first and second protrusion; and a connector disposed on the power supply rack and installed on the electrical equipment via a first and second mounting hole, the connector comprising:

a housing;

a first elastic conductive component having a first spring and a first conductive terminal, the first conductive terminal having a first upper part and a first lower part, the first lower part having a first accommodating cavity accommodating the first upper part and the first spring and a second accommodating cavity accommodating a first wire.

12. The electrical equipment of claim 11, wherein the connector further includes a second elastic conductive component.

13. The electrical equipment of claim 12, wherein the second elastic conductive component includes a second spring and a second conductive terminal.

14. The electrical equipment of claim 13, wherein the second conductive terminal includes a second upper part and a second lower part.

15. The electrical equipment of claim 14, wherein the second lower part includes a third accommodating cavity accommodating the second upper part and the second spring and a fourth accommodating cavity accommodating a second wire.

16. The electrical equipment of claim 15, wherein the first and second upper parts are in contact with the first and second protrusions of the conductive load.

17. The electrical equipment of claim 11, Wherein the conductive load is integral with the power supply board.

18. A connector comprising:

a housing; and an elastic conductive component including a conductive terminal and having a portion extending through the housing, the elastic conductive component is connectable to the wire, the elastic conductive component is movable up and down relative to the housing to connect with or separate from the conductive load, electrically connecting or disconnecting an electrical connection between the wire and the conductive load, the conductive terminal having an upper part and a lower part connected to the wire, the lower part has a locking part and the housing has a matching locking part, the lower part is fixed in the housing by cooperating between the locking part and the matching locking part.

* * * * *